Dec. 21, 1926.
H. NYQUIST
1,611,223
APPARATUS FOR CONTROLLING THE FREQUENCY OF AN ALTERNATING CURRENT
Filed Dec. 19, 1923
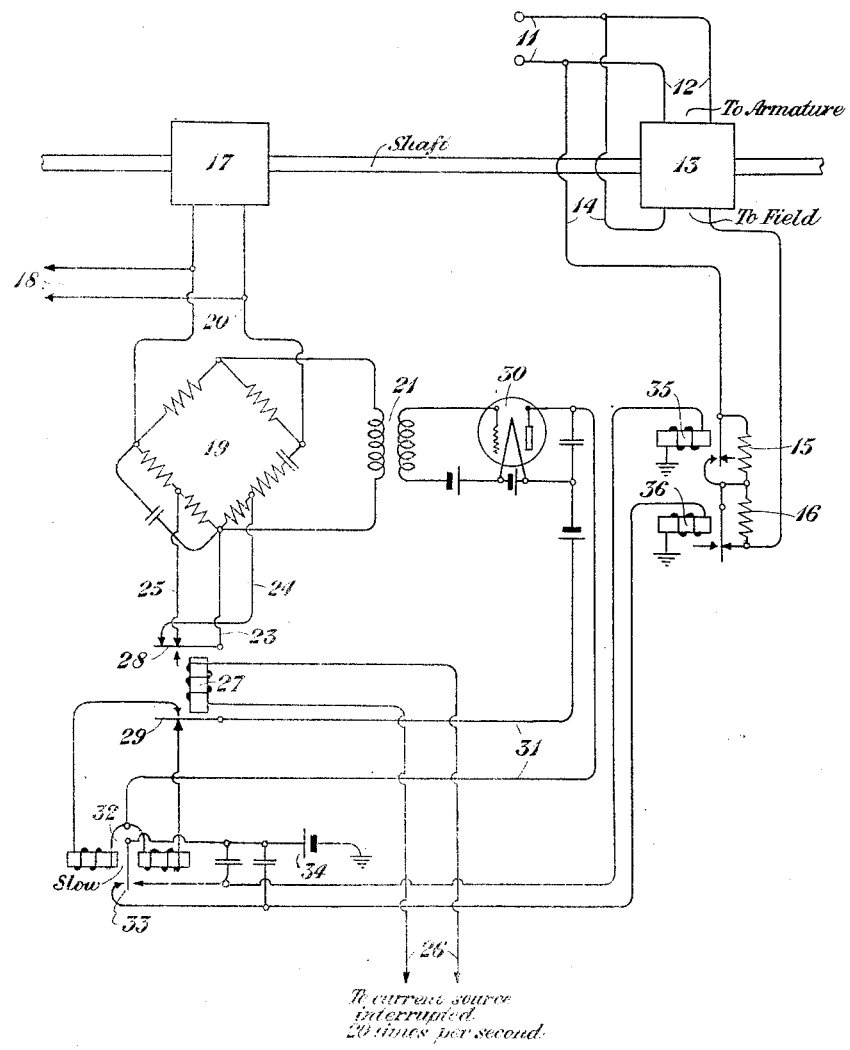
INVENTOR
H. Nyquist
BY
ATTORNEY Patented Dec. 21, 1926.

1,611,223

UNITED STATES PATENT OFFICE.

HARRY NYQUIST, OF JACKSON HEIGHTS, NEW YORK, ASSIGNOR TO AMERICAN TELEPHONE AND TELEGRAPH COMPANY, A CORPORATION OF NEW YORK.

APPARATUS FOR CONTROLLING THE FREQUENCY OF AN ALTERNATING CURRENT.

Application filed December 19, 1923. Serial No. 681,595.

A principal object of my invention is to provide a new and improved method and suitable apparatus for regulating the speed of an alternating current generator. Another object of my invention is to provide means to hold an alternating current generator at a speed determined by an independent variable current of constant frequency. Another object of my invention is to utilize a Wheatstone bridge in speed regulating apparatus for an alternating current generator. These and various other objects of the invention will become apparent on consideration of the disclosure of a specific embodiment of the principle of the invention which follows in this specification. The following description will relate to this particular embodiment with the understanding that the invention will be defined in the appended claims.

The drawing is a diagram showing the apparatus and circuits of this example of the invention. The conductors 11 lead from a direct current source to the motor 13, which is shunt-wound, the branch 12 going to the armature and the branch 14 to the field windings. The field shunt 14 may comprise the two resistances 15 and 16 in series; the resistance 15 is normally in series and the resistance 16 is normally short circuited.

The motor 13 drives an alternating current generator 17 whose output alternating current goes over the conductors 18 to the point where this current is desired to be applied.

A Wheatstone bridge 19 is provided and from the alternating current conductors 18 branch conductors 20 are taken off to the two opposite vertices of the bridge 19.

The other two opposite vertices of the bridge 19 are connected through a transformer primary 21. From one of these vertices a tap 23 goes to the armature 28 of a relay 27. A few turns distant from the tap 23, along the two respective arms of the bridge, other taps 24 and 25 are taken off which go to contacts adapted to be engaged by the armature 28.

The constants in the bridge 19 are so chosen that when the relay 27 is deenergized and its contacts are closed, thus shunting out small portions of the windings in the respective arms of the bridge 19, the bridge will then be balanced for a frequency slightly higher than the normal frequency of the generator. On the other hand, when the relay 27 is energized and its contacts are open, thus restoring all the windings to the arms of the bridge, the bridge will be in balance for a frequency slightly lower than the normal frequency of the generator. The relay 27 is supplied over the contacts 26 with an interrupted current of definite frequency, say 20 times per second, and the relay armatures 28 and 29 vibrate accordingly.

The secondary of the transformer whose primary is 21 is connected with the grid of an audion 30 whose battery adjustments make of it a detector. The output or plate circuit 31 of the audion 30 goes to the polar relay 32, the direction of the current in the winding of the polar relay 32 being determined by the position of the armature 29.

The armature 33 of the polar relay 32 connects the battery 34 alternatively to the relays 35 and 36. The polar relay 32 is made slow-acting so that it will not respond to the vibrations of the armature 29 if the currents in the two positions of that armature are substantially equal.

The operation of the device to regulate the speed of the generator 17 will now be described. As shown in the drawing, with both magnets 35 and 36 deenergized, the resistance 15 is in the field circuit and the resistance 16 is shunted out. If the magnet 35 is energized but not 36, both resistances 15 and 16 will be shunted out and the field current will be increased and accordingly the speed of the motor 13 will be decreased. On the other hand, if the magnet 36 is energized but not 35, both resistances 15 and 16 will be introduced in the field circuit and the field current will be cut down and the speed of the motor will be increased.

Consider first the operation when the frequency of the generator 17 is normal as compared with the frequency of the interrupted current coming in over the conductors 26. The relay 27 will be energized periodically and its armatures 28 and 29 will vibrate in the same period. The bridge 19 will be unbalanced to numerically the same extent whether the armature 28 is in one position or the other, and consequently a constant current will flow through the output circuit 31 of the detector 30. Since this constant current will flow in the windings of the polar relay 32, half the time in one direction and the other half of the time in the other direction, the net effect on the armature of the polar relay 32 will be nil, on the understanding that it is slow-acting enough so that it will not follow the vibrations of the armature 29. Consequently, the armature 33 of the polar relay 32 will remain in its neutral position and no change will be made in the resistance of the field circuit 14 of the motor 13.

Next assume that the generator frequency differs slightly from the normal frequency determined by the variable current coming in over the conductors 26. In this case the unbalance current in the transformer primary 21 will be different when the controlling relay armature 28 is in one position from that when the same armature is in the other position. As a result, the output current from the detector 30 will fluctuate in correspondence with the action of the controlling relay 27. Since this controlling relay 27 also reverses the direction of current in the polar relay 32, it follows that the current in the windings of this polar relay 32 will be greater in one direction than in the other direction, and therefore, the total effect on the relay 32 will be no longer nil. If the departure from normal in the generator speed exceeds a certain value, the polar relay armature 33 will make contact on one side or the other depending on whether the generator speed is higher or lower than normal. If the generator speed is higher than normal, the armature 33 goes down and closes the circuit through the windings of the relay 35 and this will decrease the speed of the motor 13 as already explained. On the other hand, if the armature 33 goes up, it will close the circuit through the relay 36 and as explained heretofore, this will eventuate in an increase in speed of the motor 13.

I claim:

1. An alternating current generator, a Wheatstone bridge with a pair of opposite terminals connected to the generator, independent means periodically to change the bridge to make it balance at a frequency alternately above and below normal, an integrating relay connected to be actuated by the unbalance current from the other two terminals of the bridge, and a motor driving said generator and controlled by said relay.

2. An alternating current generator, a Wheatstone bridge with one pair of opposite terminals connected to the generator, a motor driving the generator, and means to control the speed of the motor by the current from the bridge.

3. An alternating current generator, a Wheatstone bridge with one pair of opposite terminals connected to the generator, a motor driving the generator, an independent source of periodically variable current and means to control the speed of the motor by the current from the bridge in conjunction with said variable current from said independent source.

4. An alternating current generator, a Wheatstone bridge with one pair of opposite terminals connected to the generator, a motor driving the generator, an audion having its input connected to the remaining two terminals of the bridge, and means to control the speed of the motor by the output current from the audion.

5. An alternating current generator, a network with two conjugate pairs of points, one pair connected with the generator, driving means for the generator, and means connected to the other pair of points for controlling the speed at which the said driving means drives the generator.

6. An alternating current generator, a Wheatstone bridge with two of its opposite terminals connected with the generator, means to give the bridge two adjustments so that it will be in balance at a slightly higher frequency than normal for one adjustment and at a slightly lower frequency than normal for the other adjustment, a regularly variable current source applied to said means to effect these adjustments alternately in succession, and means actuated by the unbalance current of the bridge to control the speed of the generator.

In testimony whereof, I have signed my name to this specification this 18th day of December 1923.

HARRY NYQUIST.